Sept. 2, 1952  J. G. LEE  2,609,053

SHROUDED TAIL ROTOR

Filed Oct. 31, 1946

JOHN G. LEE
INVENTOR

BY Charles L. Shelton

ATTORNEY

Patented Sept. 2, 1952

2,609,053

UNITED STATES PATENT OFFICE 2,609,053

SHROUDED TAIL ROTOR

John G. Lee, Farmington, Conn., assignor to United Aircraft Corporation, East Hartford, Conn., a corporation of Delaware Application October 31, 1946, Serial No. 706,872

1 Claim. (Cl. 170—135.22)

This invention relates to improved thrust generating means for aircraft, and more particularly to controls for helicopters or the like including a control rotor which may also function to counterbalance the torque of a second rotor, as required.

In helicopters known as the single rotor type, a sustaining rotor provides sustentation and propulsion, and an auxiliary, or tail, rotor balances the torque of the sustaining rotor and also provides directional control. The proportion of power used by the two rotors may vary widely, but for most purposes the tail rotor may use from approximately five to twelve percent of the total power of the engine. With a two hundred horsepower engine, the tail rotor may absorb from ten to twenty-five horsepower. The time that most power is used is at takeoff at zero airspeed. Accordingly the useful load of a helicopter must be reduced from the maximum load that can be supported in flight, when less power is required to balance torque, because the tail rotor uses a larger portion of the power available at takeoff. With the present invention the saving power to the torque balancing rotor gives a greater useful load.

A feature of the invention is that the percentage of power requirements of the tail rotor is reduced substantially. Such feature is obtained by providing a surface, or shroud, around the tail rotor. The shroud may be of variable capacity, or the rotor may be variable capacity, or both may be, for control purposes.

With the above feature, several other advantages may be had, for example, a smaller tail rotor may be used, or a slower speed for the tail rotor may be employed, the shroud will protect personnel, more compact controls become practicable, and many others.

Hence, an object of this invention is to provide an improved rotor for a helicopter, or the like, and improved controls therefor.

Other objects and advantages lie in the construction and arrangement of parts, and will be either obvious or pointed out in the following specification and claim.

Figure 5:
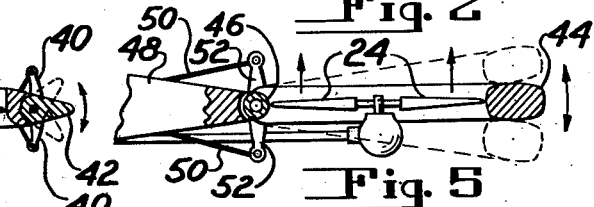
Figure 6:
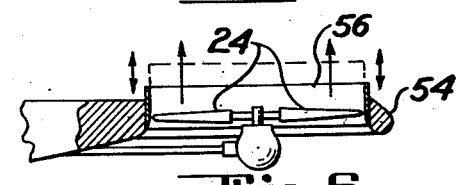
Figure 7:
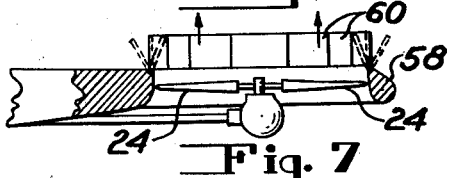

Figs. 5, 6, and 7 are partial sectional views of three other modifications, and

Figure 8:
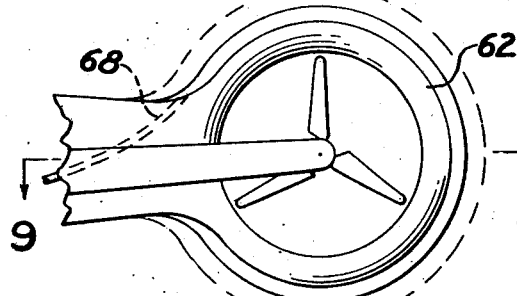
Figure 9:
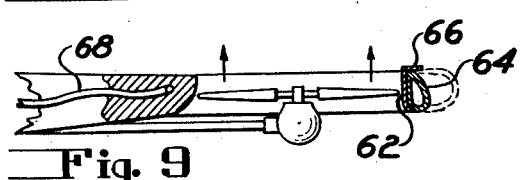

Figs. 8 and 9 are elevational and sectional views respectively of another modification.

Figure 1:
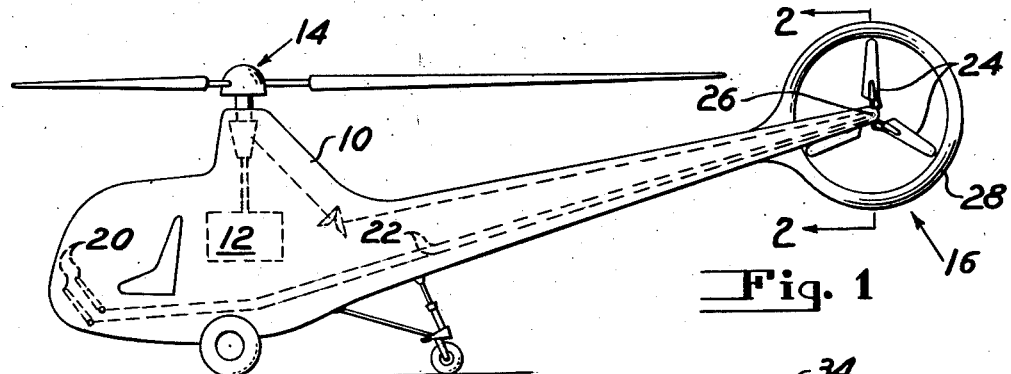
Fig. 1 is a diagrammatic elevational view of a helicopter including one form of my invention.

Referring more in detail to the drawings, and first to Fig. 1, a helicopter body 10 supports an engine 12 for turning a sustaining rotor 14 and a torque compensating rotor 16 through suitable transmission mechanism, for example, a drive shaft. The sustaining rotor may be of any type suitable for providing for lift of the body 10 and parts connected therewith, and may also provide for propulsion of the helicopter. The invention herewith is not limited to any specific sustaining rotor or means of propulsion but is more concerned with providing an improved thrust producing rotor such as indicated by the reference character 16.

With power supplied to the main rotor 14 from the engine 12 there will be a torque force tending to rotate the body 10 in a direction opposite to the direction of rotation of the rotor 14. The rotor 16 is arranged to counteract this tendency of the body 10 to rotate and further provide directional control for the helicopter. By way of example, pedals 20 may be used to position cables 22 to vary the pitch of blades 24 through a control mechanism 26 which may be substantially of the type disclosed in the patent of I. I. Sikorsky No. 2,318,260.

Figure 2:
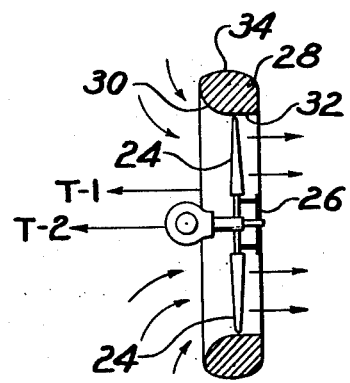
Fig. 2 is a partial sectional view taken on the line 2—2 of Fig. 1.
Figure 4:
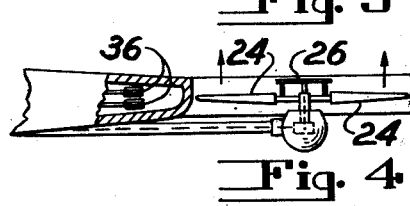
Fig. 4 is a partial sectional view taken on the line 4—4 of Fig. 3.

In order to reduce the power requirements of the rotor 16 to a minimum within practical limits and to provide an improved tail rotor structure better adapted to yawing flight, I provide a shroud 28 around the path of the tips of the blades 24. The shroud 28 may be shaped with a smoothly curved inlet 30 and a throat 32 to direct air into the tips of the blades 24. The shroud 28 should have as little clearance as possible between its internal diameter and the external diameter of the propeller; however, the internal surface thereof forms a duct for a distance upstream and downstream of the propeller. The shroud may have an exterior surface shaped to reduce turbulence losses during forward flight to a minimum. Air is drawn into the shroud in the direction of the arrows in Fig. 2 and flows at a high velocity over the curved surface 30. Such flow will cause a low pressure to exist at the surface 30 and a thrust T-1 to be exerted by the shroud. The thrust T-1 will augment thrust T-2 exerted by the blades 24. It has been found that a thrust gain of substantially twenty percent is obtained by a structure such as described. Accordingly it becomes possible to reduce either the power required by a conventionally sized rotor, or to reduce the diameter of the tail rotor and expend the same power.

Figure 3:
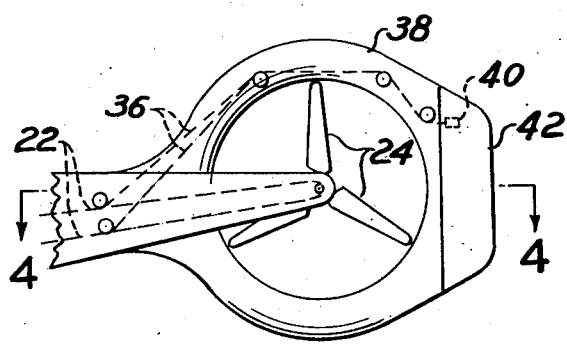
Fig. 3 is a side view of another form of the invention.

A further advantage of this invention lies in providing conveniently for directional control during forward flight by using a rudder. As shown in Fig. 3, the control cables 22 for the rotor blades 24, (which may be the same as the rotor blades described in connection with Figs. 1 and 2, and controlled in the same manner) are connected with cables 36 that may pass within a shroud 38 over suitable pulleys and connect with horns 40 for turning a rudder 42 to provide for additional directional control for the helicopter. It will be understood that any suitable proportion of control may be assumed by the blades 24, shroud 38 and rudder 42 to obtain the best results for any given helicopter. The exact proportion of these parts may best be left to the mechanics skilled in the art for use with different sized craft.

In Fig. 5, a modified form of shroud 44 is connected by a pivot 46 to a tail 48 of a helicopter. The tail rotor blades 24 may be of the fixed pitch type if desired or of the variable pitch type to provide for additional control. For most control purposes it is possible to vary the position of the shroud 44 by actuating cables 50 connected with suitable manual controls, not shown, at one end, and to horns 52 at the other end to rotate the shroud 44. Movement of the shroud 44 will vary the effective thrust of the shroud and hence vary the total thrust-rotor combination. Furthermore, movement of the shroud 44 will have a rudder effect to further control the heading of the helicopter. Any suitable proportions for the shroud may be used to obtain the most desirable action for any given helicopter.

Fig. 6 shows a shroud 54 associated with rotor blades 24 for producing thrust. The total thrust of the shroud-blade combination may be controlled by moving a sleeve 56 in and out of the interior of the shroud 54 to vary the length or extent of the shroud thereby extending the duct defined by the shroud and varying the thrust of the shroud-rotor combination.

Fig. 7 shows a modified means of varying the total thrust of blades 24 and a shroud 58 comprising hinged panels 60 which may be moved toward or away from each other to more or less restrict the duct defined by the shroud 58 to vary the velocity of the air issuing from the blades 24 and further to vary the effectiveness of the shroud 58 in generating thrust. The configuration of the duct defined by the shroud including its panels 60 may be controlled by manual means, not shown, in any convenient manner such as by cables or rods.

Figs. 8 and 9 show another means for further varying the shape of a shroud 62. An expansible tube, which may be made of live rubber, is mounted between the exterior of the shroud 62 and a flange 66. A control tube 68 may connect with a manually controlled valve from a source of fluid pressure, not shown, which can supply or vent fluid to the tube 64 to expand or contract the same. As the tube 64 is expanded its component of thrust will be increased and as it is contracted this component will be decreased.

While I have shown and described different modifications for practicing my invention, obviously other modifications and different arrangements of the modifications shown and described will occur to those skilled in the art. For this reason I wish not to be limited in my invention only to those forms shown and described but by the scope of the following claim.

I claim:

In a helicopter having an elongated body, a main sustaining rotor located in the forward portion of said body which exerts a torque tending to rotate said body about the main rotor drive shaft, an anti-torque rotor located in the aft portion of said body and rotatable about an axis transverse to said body for accelerating air to produce a lateral thrust acting on said body to oppose the torque of said main rotor, and means for increasing the thrust of said anti-torque rotor comprising an annular shroud surrounding the blade tips of the rotor, the shroud including inner and outer telescoping members, said outer member having an outwardly flared annular lip portion on the side of the advancing air which merges into an axial portion of uniform diameter terminating on the side of the retreating air, and said inner telescoping member having an axial sleeve portion of uniform outside diameter closely receivable within and slidable axially along the axial portion of said outer member into an extended position in which it projects beyond said outer member on the side of the latter opposite said lip portion.

JOHN G. LEE.

REFERENCES CITED

The following references are of record in the file of this patent:

UNITED STATES PATENTS

| Number | Name | Date |
|---|---|---|
| D. 139,632 | Walker | Dec. 5, 1944 |
| 1,971,734 | Stalker | Aug. 28, 1934 |
| 2,123,657 | Munk | July 12, 1938 |
| 2,322,715 | Kloeren | June 22, 1943 |
| 2,369,652 | Avery | Feb. 20, 1945 |
| 2,378,617 | Burke | June 19, 1945 |
| 2,385,889 | Skavinsky | Oct. 2, 1945 |
| 2,415,622 | Bossi | Feb. 11, 1947 |
| 2,475,022 | Gregg | July 5, 1949 |

FOREIGN PATENTS

| Number | Country | Date |
|---|---|---|
| 11,090 | Great Britain | 1909 |
| 572,417 | Great Britain | Oct. 8, 1945 |